(12) United States Patent
Joseph et al.

(10) Patent No.: US 11,470,678 B2
(45) Date of Patent: Oct. 11, 2022

(54) BROADCAST OF MULTIPLE PHYSICAL CELL IDENTITY RANGES

(71) Applicant: QUALCOMM Incorporated, San Diego, CA (US)

(72) Inventors: Vinay Joseph, Ker (IN); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/037,358

(22) Filed: Sep. 29, 2020

(65) Prior Publication Data

US 2021/0100062 A1 Apr. 1, 2021

Related U.S. Application Data

(60) Provisional application No. 62/908,546, filed on Sep. 30, 2019.

(51) Int. Cl.
*H04W 76/27* (2018.01)
*H04W 72/04* (2009.01)

(52) U.S. Cl.
CPC ....... *H04W 76/27* (2018.02); *H04W 72/0406* (2013.01)

(58) Field of Classification Search
None
See application file for complete search history.

(56) References Cited

U.S. PATENT DOCUMENTS

| 2010/0069119 A1* | 3/2010 | Mueck | H04J 11/0073 |
| | | | 455/561 |
| 2011/0216732 A1* | 9/2011 | Maeda | H04W 4/08 |
| | | | 370/329 |
| 2011/0261777 A1 | 10/2011 | Maeda et al. | |
| 2011/0280223 A1* | 11/2011 | Maeda | H04W 4/08 |
| | | | 370/335 |
| 2012/0261777 A1* | 10/2012 | Shukh | G11B 5/3909 |
| | | | 257/E29.323 |

(Continued)

FOREIGN PATENT DOCUMENTS

| WO | WO-2010050719 A2 * | 5/2010 | ............ H04W 48/16 |
| WO | WO-2020249302 A1 * | 12/2020 | ............ H04W 48/20 |

OTHER PUBLICATIONS

International Search Report and Written Opinion—PCT/US2020/053578—ISA/EPO—dated Jan. 14, 2021.

*Primary Examiner* — Jamaal Henson

(74) *Attorney, Agent, or Firm* — Arent Fox, LLP

(57) ABSTRACT

Apparatus, methods and computer-readable media for broadcast of multiple physical cell identity ranges are disclosed herein. A user equipment (UE) can receive system information (SI) containing physical cell identities (PCIs) associated with a first cell type or a second cell type, in which the first cell type is accessible to a first set of UEs and the second cell type is accessible to a second set of UEs and a second set of PCIs containing PCIs corresponding to a set of cells of the second cell type. The UE can also monitor for cells with a PCI in the first set of PCIs or the second set of PCIs. A base station may generate the SI indicating the first set of PCIs and the second set of PCIs. Additionally, the base station can communicate the SI to one or more UEs.

30 Claims, 13 Drawing Sheets

(56) References Cited

U.S. PATENT DOCUMENTS

| | | | |
|---|---|---|---|
| 2013/0083744 A1* | 4/2013 | Peng | H04B 7/0619 |
| | | | 370/329 |
| 2014/0010139 A1* | 1/2014 | Choi | H04W 48/16 |
| | | | 370/312 |
| 2014/0092758 A1* | 4/2014 | Suzuki | H04W 48/18 |
| | | | 370/252 |
| 2014/0112243 A1* | 4/2014 | Suzuki | H04W 56/00 |
| | | | 370/328 |
| 2017/0311276 A1* | 10/2017 | Tsai | H04L 27/26025 |
| 2018/0131487 A1* | 5/2018 | Ly | H04W 56/001 |

\* cited by examiner

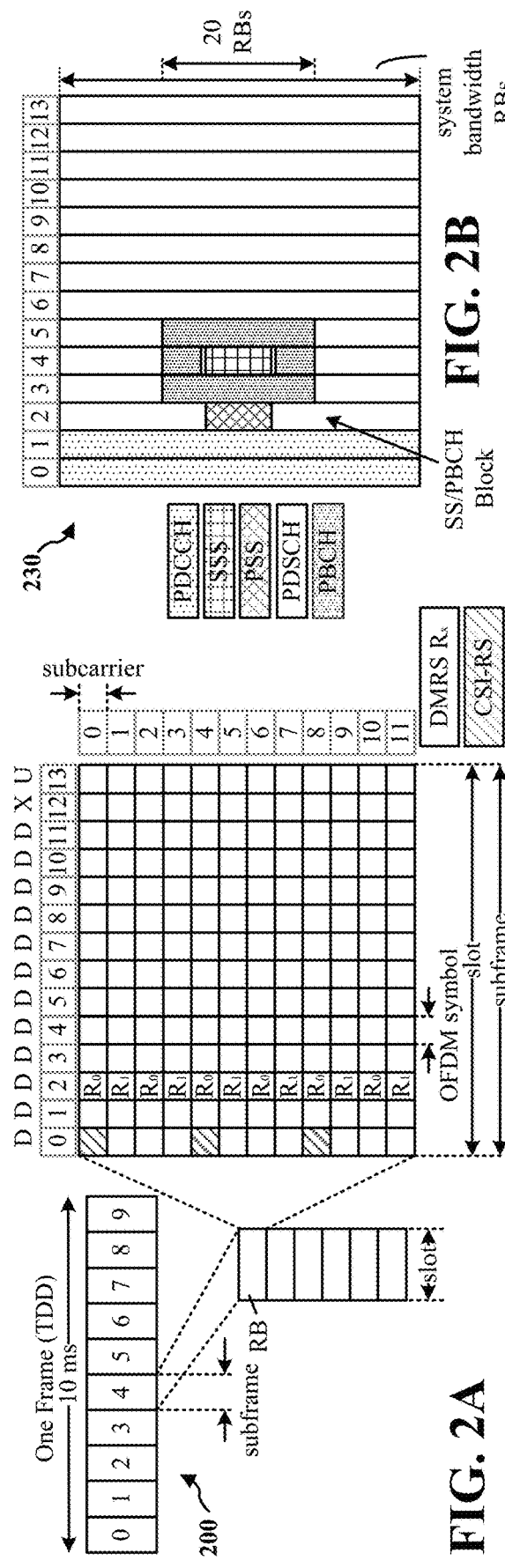
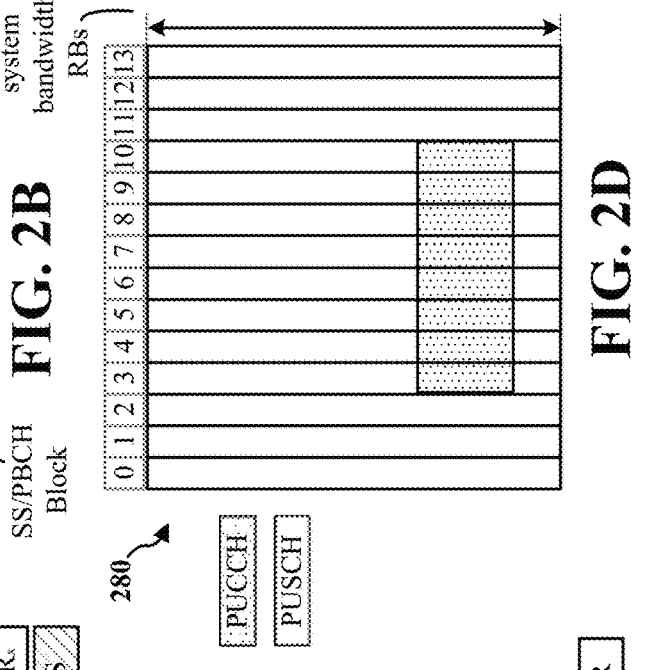
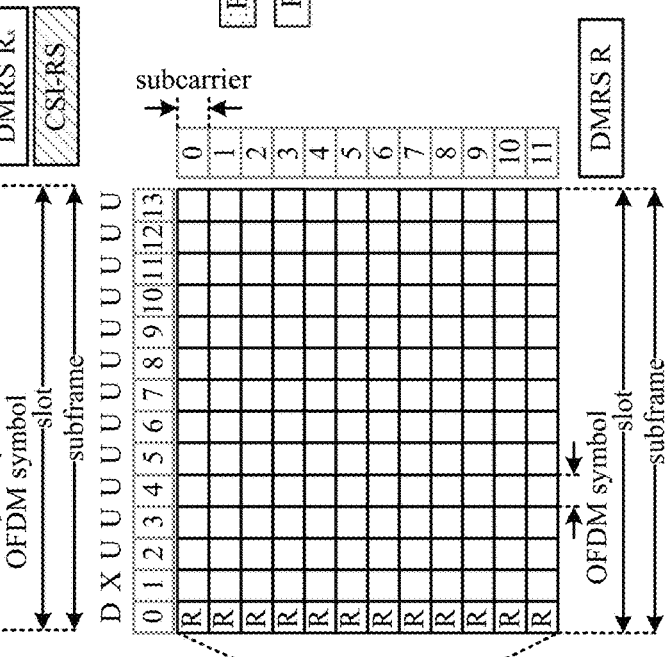
FIG. 2A
FIG. 2B
FIG. 2C
FIG. 2D

BROADCAST OF MULTIPLE PHYSICAL CELL IDENTITY RANGES

CROSS REFERENCE TO RELATED APPLICATION(S)

This application claims the benefit of U.S. Provisional Application Ser. No. 62/908,546, entitled "METHODS AND APPARATUS FOR BROADCASTING MULTIPLE PCI RANGES" and filed on Sep. 30, 2019, of which is expressly incorporated by reference herein in its entirety.

BACKGROUND

Technical Field

The present disclosure relates generally to communication systems, and more particularly, to broadcast of multiple physical cell identity ranges.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A physical cell identity (PCI) is an identifier of a cell in the physical layer of an LTE network for separating between different transmitters. The LTE network may use a system information field that identifies a set of PCIs reserved for closed subscriber group (CSG) cells on a frequency on which the field was received. 5G NR may include a similar framework for non-public networks (NPN) that can be based on either a closed access group (CAG) or standalone non-public networks (SNPN). In 5G NR, a similar system information field can be used to indicate PCIs used and/or reserved for CAG cells. This system information field in 5G NR can be used to prevent system information reading of CAG cells by non-CAG user equipments (UEs) (e.g., multi-network operator (MNO) UEs that may not access CAGs) to avoid power consumption for such UEs. The system information field also may assist in faster detection of CAG cells by CAG UEs (e.g., using an autonomous search function to detect CAG cells as a part of a cell selection/reselection procedure). For example, CAG UEs may independently determine when and/or where to search on NR frequencies for a CAG cell. However, the system information field containing such CAG cell information has to be configured accurately. Such accurate configuration can be operationally challenging for operators to keep track of PCIs used by all CAGs and configure PCI ranges in CAG cells and non-CAG cells accordingly.

The present disclosure provides for the broadcast of multiple PCI ranges, where a cell can broadcast a first set of PCIs that indicates a set of PCI ranges for CAG cells used by CAG UEs (not included in the second set of PCIs) and other cells (or non-CAG UEs) used by non-CAG UEs irrespective of whether the cells are active. The cell also may broadcast a second set of PCIs that indicates CAG cells that are actively used and are used exclusively by CAG UEs. The first set of PCIs is intended for all UEs that use public cells and the second set of PCIs is intended for CAG-capable UEs. The first set of PCIs may be transmitted to all UEs in the cell to improve search performance by limiting the PCI range searched for publicly available cells. The second set of PCIs is meant for CAG UEs to reduce their search time for local CAG cells. By sending the separate lists of PCIs, the system can ensure PCI information of CAG cells is accessed by intended CAG UEs and not read by non-CAG UEs, and can facilitate faster detection of CAG cells by CAG UEs. For example, the non-CAG UEs may be configured to avoid accessing the second set of PCIs, which is intended to be accessed exclusively by the CAG UEs. In this regard, by explicitly indicating the CAG cells in an exclusive listing, the CAG cells can increase their CAG cell detection rates and the non-CAG UEs can reduce their power consumption by reducing the number of attempts to access restricted (or private) lists. The PCI framework of the subject technology can be applied to both 5G NR non-public networks (e.g., CAG networks and SNPNs) and LTE non-public networks (e.g., CSG networks).

In an aspect of the disclosure, a method, a computer-readable medium, and an apparatus are provided. The apparatus may be a UE. In one aspect, the UE may receive, in a subband of a plurality of subbands from a cell, system information (SI) indicating a first set of physical cell identities (PCIs) containing PCIs associated with a first cell type or a second cell type, the first cell type being accessible to a first set of UEs and the second cell type being accessible to a second set of UEs and a second set of PCIs containing PCIs corresponding to a set of cells of the second cell type.

The UE also may monitor for one or more cells with a PCI in one or more of the first set of PCIs or the second set of PCIs.

In another aspect of the disclosure, a method, a computer-readable medium, and an apparatus are provided. The apparatus may be a cell or base station. In one aspect, the cell may generate system information (SI) indicating a first set of PCIs containing PCIs associated with a first cell type or a second cell type, the first cell type being accessible to a first set of UEs and the second cell type being accessible to a second set of UEs and a second set of PCIs containing PCIs corresponding to a set of cells of the second cell type. The cell can communicate, in a subband of a plurality of subbands to one or more of the first set of UEs or the second set of UEs, the SI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
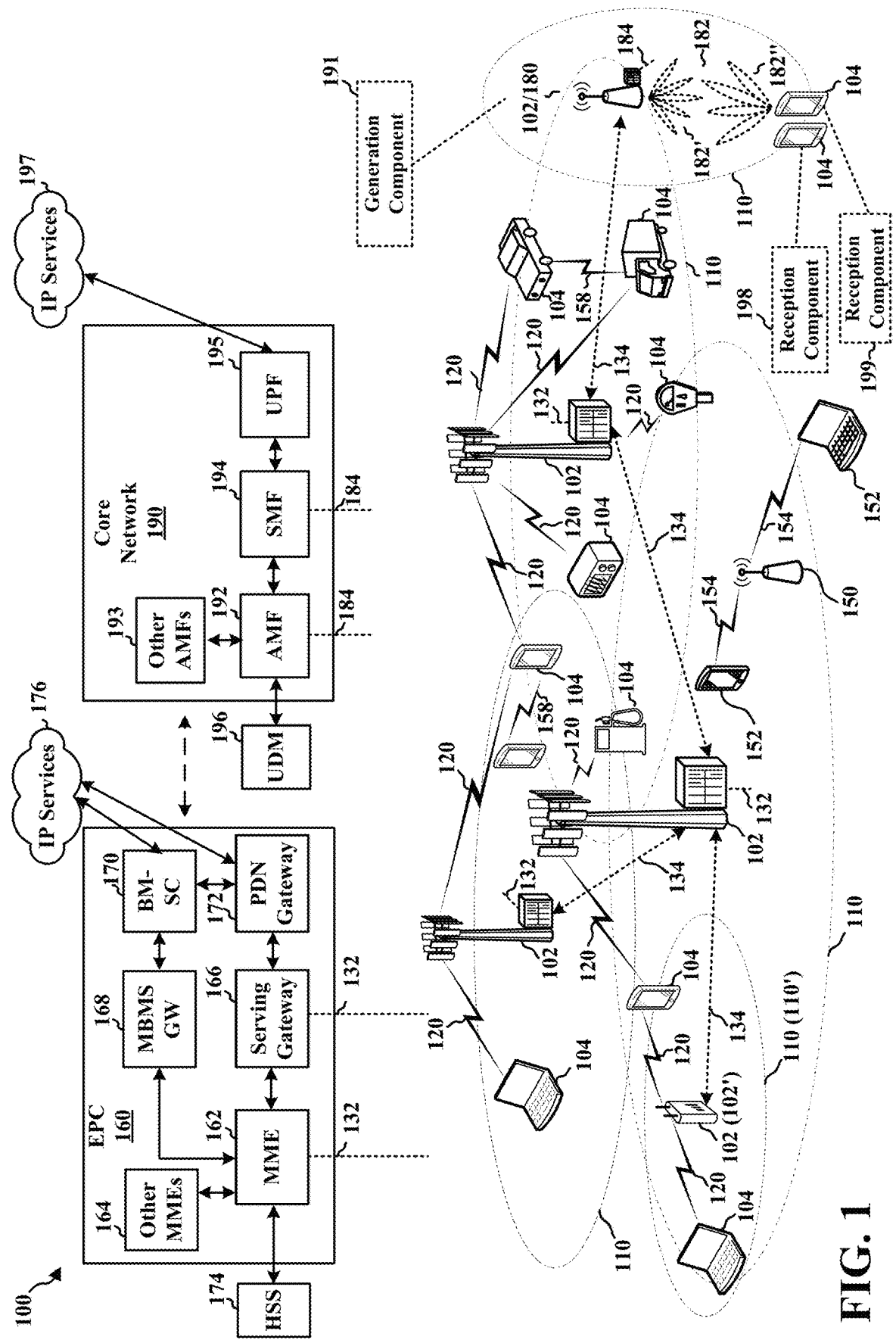
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The heterogeneous network also may provide service to other types of restricted groups, such as a CAG and a non-public network (NPN). Some examples of NPNs may include a standalone NPN (SNPN) and a public network integrated NPN (PNI NPN). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a reception component 198 configured to receive SI broadcast from a cell, the SI indicating a first set of PCIs. Also, the first set of PCIs can include PCIs associated with a first cell type or a second cell type. As used herein, a set of cells of the first cell type may be referred to as "a first set of cells" and a set of cells of the second cell type may be referred to as "a second set of cells." In some aspects, the first cell type may be accessible to a first set of UEs and the second cell type may be accessible to a second set of UEs. In some aspects, the first cell type corresponds to public cells (or non-CAG cells) and the second cell type corresponds to private cells (or CAG cells). Reception component 198 can also be configured to monitor for cells with a PCI in the first set of PCIs. Additionally, the SI can further indicate a second set of PCIs containing PCIs corresponding to a set of cells of the second cell type. In some aspects, the second set of PCIs may be actively used by the second set of UEs and are exclusively accessible to the second set of UEs. Reception component 198 can also be configured to monitor for cells with a PCI in the second set of PCIs.

Referring again to FIG. 1, in certain aspects, the UE 104 may comprise a reception component 199 configured to receive SI broadcast from a cell, the SI indicating a first set of PCIs and a second set of PCIs. The first set of PCIs can include PCIs associated with a first cell type or a second cell type, in which the first cell type is accessible to a first set of UEs and the second cell type is accessible to a second set of UEs. The second set of PCIs can include PCIs corresponding to a set of cells of the second cell type. Reception component 199 can also be configured to monitor for cells with a PCI that is exclusive to the second set of PCIs and exclusively accessible to the second set of UEs.

Referring again to FIG. 1, in certain aspects, the base station 180 may comprise a generation component 191 configured to generate a first set of PCIs including PCIs associated with a first cell type or a second cell type, in which the first cell type is accessible to a first set of UEs and the second cell type is accessible to a second set of UEs. Generation component 191 can also be configured to broadcast SI indicating the first set of PCIs. Generation component 191 can also be configured to generate a second set of PCIs including PCIs corresponding to a set of cells of the second cell type. Also, the broadcast SI can further indicate the second set of PCIs.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identity (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
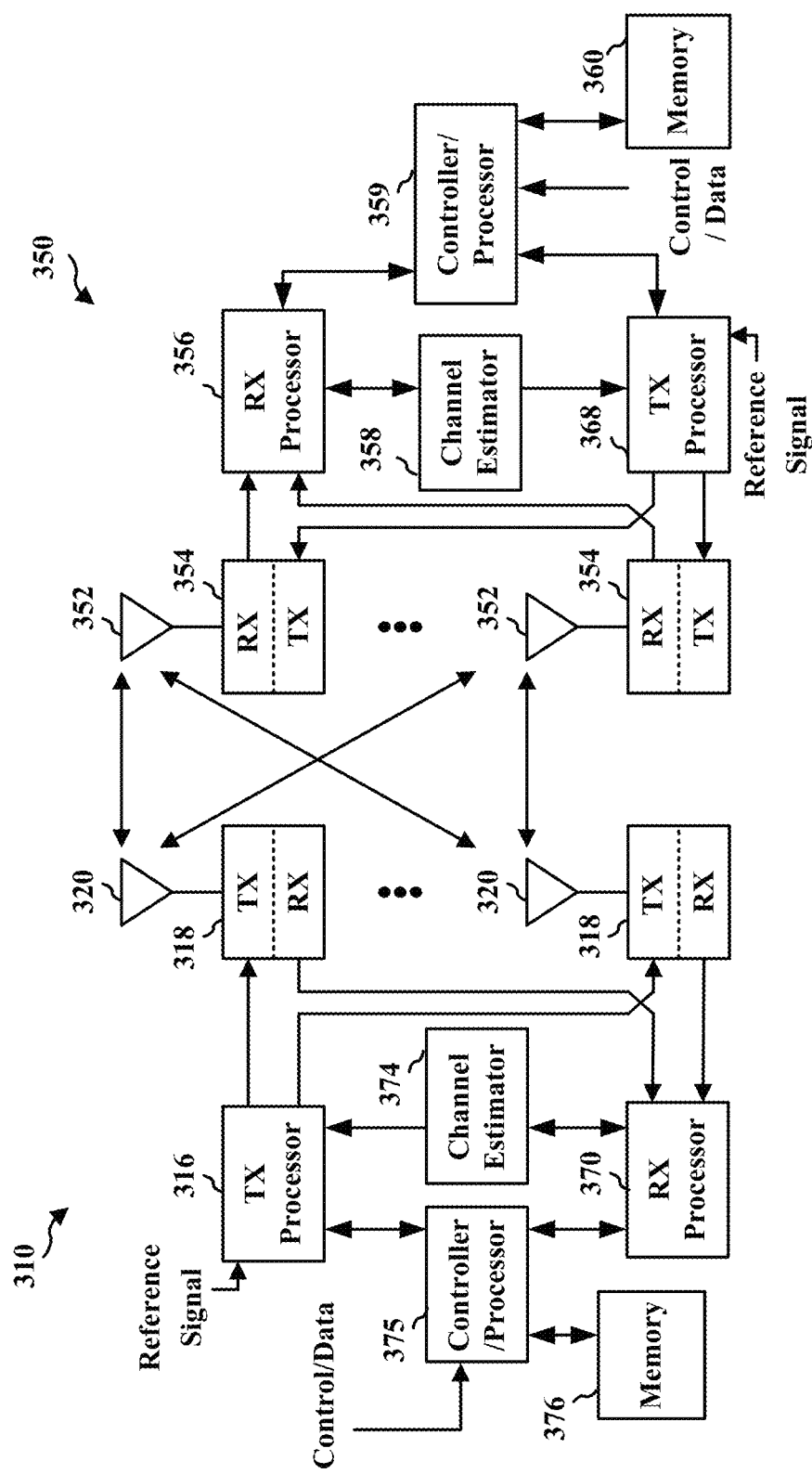
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the generation component 191 of FIG. 1. In some aspects, the generation component 191 may be configured to generate system information indicating a first set of physical cell identities for a first set of cells or a second set of cells and a second set of PCIs exclusively for the second set of cells.

At least one of the TX processor 368, the RX processor 356, and the controller/processor 359 may be configured to perform aspects in connection with the reception component 198 of FIG. 1. In some aspects, the UE 104 having the reception component 198 may be configured to receive, in a subband of a plurality of subbands from a cell (e.g., base station 102/180), system information indicating a first set of physical cell identities for a first set of cells or a second set of cells and a second set of PCIs exclusively for the second set of cells. The UE 104 may be a CAG UE and may monitor for one or more cells with a PCI in one or more of the first set of PCIs and/or the second set of PCIs. In other implementations, the UE may be a non-CAG UE and monitor for one or more cells with a PCI in the first set of PCIs (with restricted access to the second set of PCIs).

At least one of the TX processor 368, the RX processor 356, and the controller/processor 359 may be configured to perform aspects in connection with the reception component 199 of FIG. 1. In some aspects, the UE 104 having the reception component 199 may receive, in a subband of a plurality of subbands from a cell (e.g., base station 102/180), system information indicating a first set of physical cell identities for a first set of cells or a second set of cells and a second set of PCIs exclusively for the second set of cells. In some aspects, the UE may be a non-CAG UE and may monitor for one or more cells with a PCI in the first set of PCIs (with restricted access to the second set of PCIs). In this regard, the UE 104 may not read the second set of PCIs and thereby conserve power. In other implementations, the UE 104 may be a CAG UE and may monitor for one or more cells with a PCI in one or more of the first set of PCIs and/or the second set of PCIs.

In some implementations, 5G NR may include support for non-public networks that can be based on either a closed access group (CAG) or standalone non-public networks. In 5G NR, a system information field can be used to indicate PCIs used and/or reserved for CAG cells. This system information field in 5G NR can be used to prevent system information reading of CAG cells by non-CAG user equipment (e.g., multi-network operator UEs that may not access CAGs) to avoid power consumption for such UEs. The system information field also may assist in faster detection of CAG cells by CAG UEs (e.g., using an autonomous search function to detect CAG cells). However, the system information field containing such CAG cell information has to be configured accurately. Such accurate configuration can be operationally challenging for operators to keep track of PCIs used by all CAGs and configure PCI ranges in CAG cells and non-CAG cells accordingly.

The present disclosure provides for the broadcast of multiple PCI ranges, where a cell can broadcast a first set of PCIs not used by non-CAG cells and a second set of PCIs used exclusively by CAG cells. By sending the separate lists of PCIs, the system can ensure PCI information of CAG cells is accessed by intended CAG UEs and not read by non-CAG UEs, and can facilitate faster detection of CAG cells by CAG UEs. The PCI framework of the subject technology can be applied to both 5G NR non-public networks (e.g., CAG networks and SNPNs) and LTE non-public networks (e.g., CSG networks).

In some aspects, a PCI range can be part of a system information block or system information, e.g., as an information element. In some aspects, PCI ranges can be reserved for CSG cells. In addition, a PCI can be read (or constructed) from one or more synchronization signals (e.g., PSS, SSS). In some instances, once a PCI is read from a synchronization signal, the UE can decide whether the UE can read the corresponding system information.

CAG PCI ranges can be used for a variety of different functions. For example, as indicated above, CAG PCI ranges can be used to prevent non-CAG or public UEs, (e.g., MNO UEs that may access CAGs) from reading the SI of CAG cells to avoid unnecessary power consumption by such UEs. Accordingly, a CAG PCI range can benefit non-CAG UEs, as they may not have to monitor for these CAG PCIs. Indeed, non-CAG UEs can ignore the system information of the cells with PCIs in this PCI range. As an SI reading can consume more power compared to performing a PCI reading, UEs may try to avoid an SI reading in an effort to reduce power consumption. In some aspects, these CAG PCI ranges can be broadcast from private cells or public cells, as public UEs can benefit from these ranges.

Additionally, CAG PCI ranges can be used to assist in faster detection of CAG or private cells by CAG or private UEs. For example, CAG PCI ranges can be used by CAG UEs to more quickly detect CAG cells using an autonomous search function or monitoring process. Accordingly, CAG UEs can utilize the indicated CAG PCI ranges to discover private or non-public cells more quickly. In some aspects, CAG UEs can search within a designated set of frequencies as indicated in the system information and discover any CAG cells on the set of frequencies based on the search.

Figure 4:
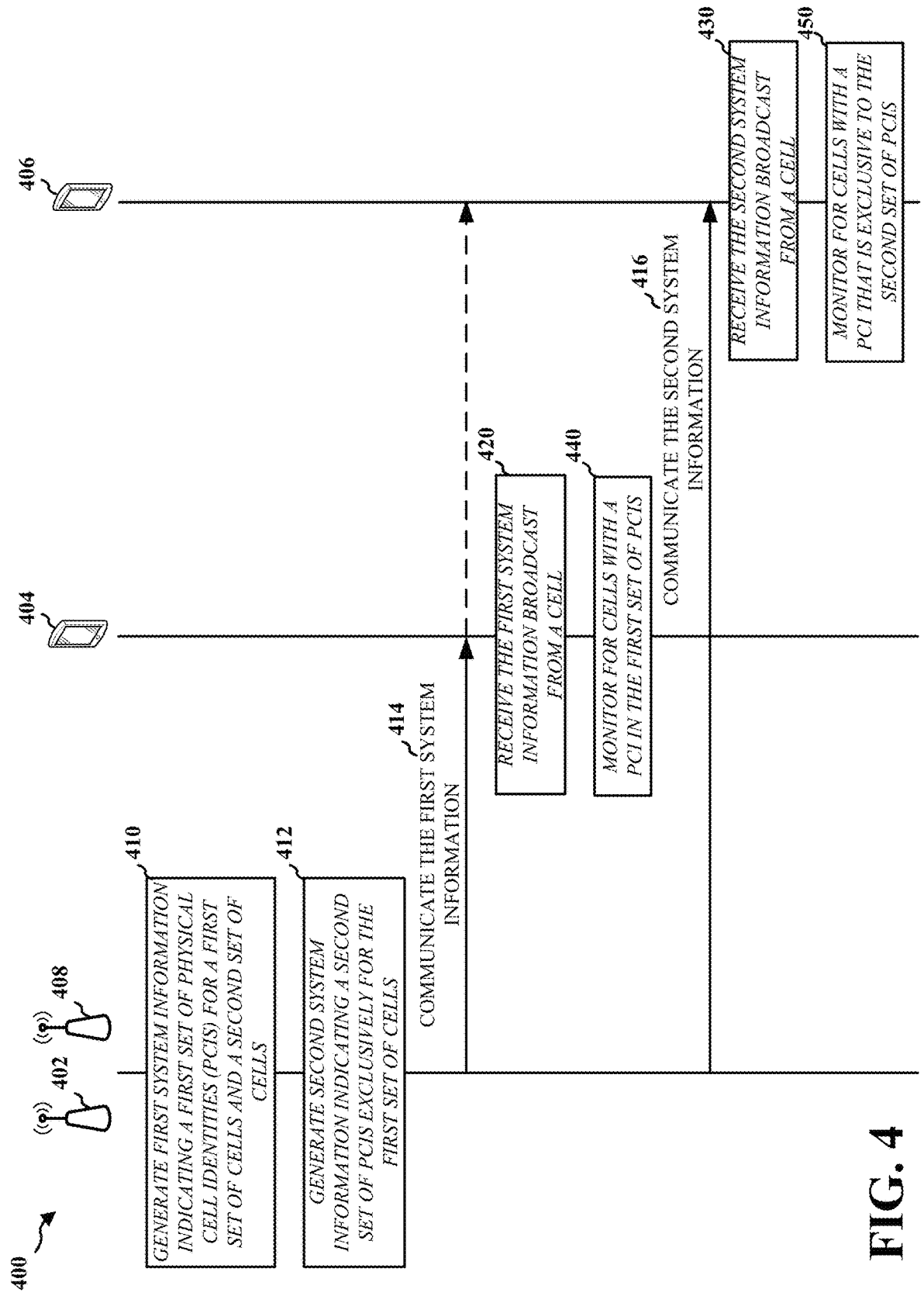
FIG. 4 is a diagram illustrating transmissions between one or more UEs and one or more cells or base stations in accordance with some aspects of the present disclosure.

FIG. 4 is a diagram 400 illustrating transmissions between one or more cells, e.g., cells 402, 408, and one or more UEs, e.g., UEs 404, 406. At 410, cell 402 can generate first system information indicating a first set of physical cell identities including at least PCIs that are used by either a first set of cells or a second set of cells. In some aspects, the first set of PCIs can be generated to further include PCIs that are used by the first set of cells. Additionally, the first set of PCIs can include PCIs on a first set of frequencies. At 412, cell 402 can generate second system information indicating a second set of PCIs including PCIs that are used exclusively by the second set of cells. The second set can include PCIs on a second set of frequencies. Additionally, the second set of frequencies associated with the second set can be indicated in the SI.

At 414, cell 402 can communicate the first system information. For example, the cell 402 can broadcast the first system information indicating the first set of PCIs. The first set of frequencies associated with the first set of PCIs can also be indicated in the first system information. In some aspects, the first broadcast SI can further indicate the second set of PCIs. In some aspects, a set of frequencies can be a single carrier, multiple carriers or a band of carriers, or a set of frequencies associated with a certain wireless technology.

As shown in FIG. 4, in some aspects, cell 402 can also transmit or broadcast a synchronization signal block, a system information block, or a master information block along with the SI. In some aspects, the SI can include one or more of a MIB or a plurality of SIBs. In some aspects, the system information block includes a SIB Type 4 (SIB4) message.

In some instances, the first set can be indicated by an information element having at least one of a smallest PCI in the first set or a largest PCI in the first set. Moreover, the second set can be indicated by an information element comprising at least one of a smallest PCI in the second set or a largest PCI in the second set.

In some aspects, the second set of cells can include one of closed access group cells, close subscriber group cells, or standalone non-public network cells. The second set of cells can include one of non-CAG cells, non-CSG cells, or public land mobile network cells. Also, in some aspects, cell 402 can be a CAG cell, a CSG cell, or a SNPN cell. In addition, cell 402 can be a non-CAG cell, a non-CSG cell, or a PLMN cell. In some instances, the cell 402 can be a base station or a component of a base station (e.g., a central unit (CU) or distributed unit (DU)).

At 420, UE 404 can receive the SI broadcast from cell 402 in a subband of a plurality of subbands. In some examples, the SI broadcast includes the first system information. The SI can indicate a first set of PCIs, the first set of PCIs including at least PCIs that are used by either a first set of cells or a second set of cells. Also, the SI can further indicate a second set of PCIs, the second set of PCIs including PCIs that are used exclusively by the second set of cells. As discussed above, the present disclosure provides for the broadcast of multiple PCI ranges, where a cell can broadcast a first set of PCIs that indicates CAG cells used by CAG UEs (not included in the second set of PCIs) and other cells (or non-CAG UEs) used by non-CAG UEs and a second set of PCIs that indicates CAG cells used exclusively by CAG UEs. By sending the separate lists of PCIs, the system can ensure PCI information of CAG cells is accessed by intended CAG UEs and not read by non-CAG UEs, and can facilitate faster detection of CAG cells by CAG UEs. For example, the non-CAG UEs may be configured to avoid accessing the second set of PCI's, which is intended to be accessed exclusively by the CAG UEs. In this regard, by explicitly indicating the CAG cells in an exclusive listing, the CAG cells can increase their CAG cell detection rates and the non-CAG UEs can reduce their power consumption by reducing the number of attempts to access restricted (or private) lists.

In an aspect, the subband can include a first set of frequencies and a second set of frequencies. In some aspects, the first set can be associated with the first set of frequencies and the monitoring includes monitoring for the set of frequencies. Also, the second set can be associated with the second set of frequencies. In some examples, the UE 404 may be a non-CAG UE such that the UE 404 has restricted access to the second set of PCIs. In this regard, the UE 404 as a non-CAG UE may not read the second set of PCIs and thereby conserve power.

At 440, UE 404 can monitor for cells, e.g., cells 402, 408, with a PCI in the first set of PCIs. In some aspects, the UE 404 may be a CAG UE. In this regard, the monitoring can include monitoring for cells with a PCI in the second set of PCIs. Also, the monitoring can include monitoring for a set of frequencies. The monitoring can also include at least one of an autonomous search function or a search based on a configuration received in an SI or radio resource control message. For example, a CAG UE may use an autonomous search function to detect CAG cells as a part of a cell selection/reselection procedure by independently determining when and/or where to search on NR frequencies for a CAG cell.

In some aspects, the UE 404 can prioritize cells with PCIs in the first set for at least one of a SI reading, a master information block reading, a system information block reading, a cell measurement, or a cell search. For example, the UE 404 may prioritize based on a frequency of a CAG or non-CAG cell for cell selection/reselection. The UE 404 can also prioritize cells with PCIs in the second set for at least one of a SI reading, a MIB reading, a SIB reading, a cell measurement, or a cell search. For example, the UE 404 may prioritize based on a frequency of a CAG cell for cell selection/reselection of CAG cells. Also, the UE 404 can be one of a UE capable of accessing the first set of cells, a UE with a subscription allowing access to the first set of cells, a UE capable of accessing SNPNs, or a UE capable of accessing CSGs.

At 416, cell 402 can broadcast system information indicating the first set of PCIs. In some aspects, the broadcast SI can further indicate the second set of PCIs. The second set can include PCIs on a second set of frequencies. Although FIG. 4 illustrates the first system information and second system information transmitted as separate downlink transmissions to the UEs 404 and 406, respectively, the first system information and second system information may be transmitted as a single (or combined) downlink broadcast to the UEs 404 and 406.

At 430, the UE 406 can receive SI broadcast from cell 402 in the subband of the plurality of subbands. In some examples, the SI broadcast includes the second system information. In some aspects, the SI broadcast can indicate the second set of PCIs. In some aspects, the second set of PCIs can include PCIs that are used exclusively by the second set of cells. In some instances, the second set can be associated with the second set of frequencies. In other implementations, the UE 406 can receive the SI broadcast that includes the first set of PCIs and the second set of PCIs.

At 450, UE 406 can monitor for cells, e.g., cells 402, 408, with a PCI that is exclusive to the second set of PCIs. Additionally, the monitoring can comprise monitoring for a set of frequencies. Also, the monitoring can comprise at least one of an autonomous search function or a search based on a configuration received in an SI or radio resource control (RRC) message. In some aspects, the UE 406 can be one of a UE not capable of accessing the second set of cells, a UE whose subscription does not allow access to the second set of cells, a UE not operating in SNPN access mode, a UE not capable of accessing CSGs, or a UE whose subscription does not allow accessing CSGs.

Figure 5:
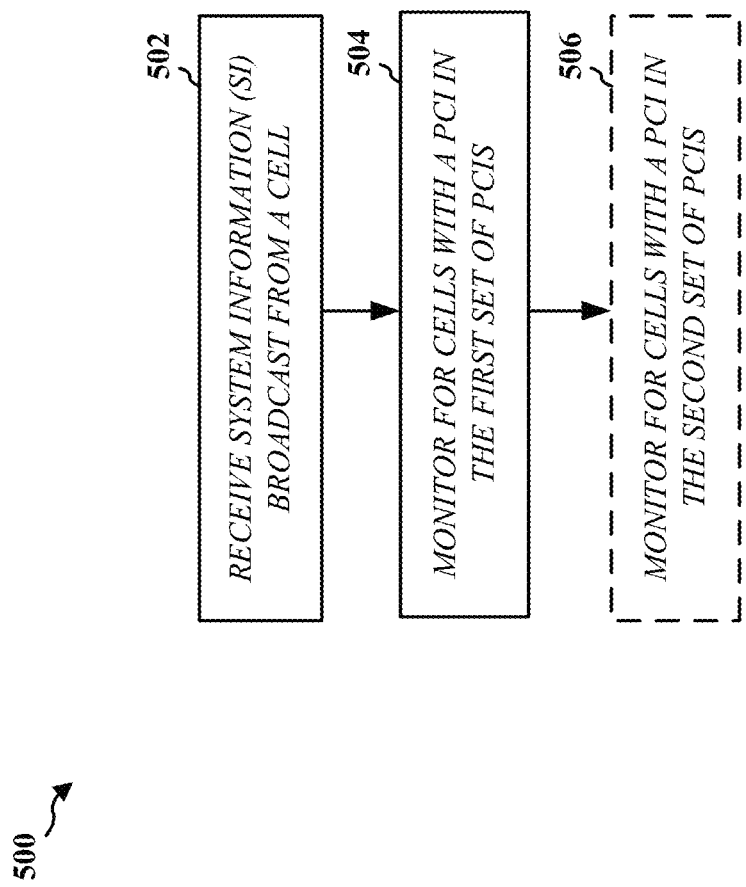
FIG. 5 is a flowchart of a method of wireless communication in accordance with some aspects of the present disclosure.

FIG. 5 is a flowchart 500 of a method of wireless communication. The method may be performed by a UE or a component of a UE (e.g., 104, 350, 404, 406; the apparatus 602/602'; the processing system 714, which may include the memory 360 and which may be the entire UE or a component of the UE, such as the TX processor 368, the RX processor 356, and/or the controller/processor 359) communicating with a cell or base station (e.g., base station 180, cells 402, 408, apparatus 1202). Optional aspects are illustrated with a dashed line. The methods described herein can provide a number of benefits, such as improving communication signaling, resource utilization, and/or power savings.

At 502, the UE can receive SI broadcast from a cell, where the SI can indicate a first set of PCIs, as described in connection with the example in FIG. 4. For example, reception component 604 can receive SI broadcast from a cell, where the SI can indicate a first set of PCIs. In some aspects, the first set of PCIs can include at least PCIs that are used by either a first set of cells or a second set of cells, as described in connection with the example in FIG. 4. Also, the first set can be associated with a set of frequencies, as described in connection with the example in FIG. 4. The first set of PCIs can further include PCIs that are used by the first set of cells, as described in connection with the example in FIG. 4.

At 504, the UE can monitor for cells with a PCI in the first set of PCIs, as described in connection with the example in FIG. 4. For example, monitoring component 606 can monitor for cells with a PCI in the first set of PCIs. At 506, the UE can monitor for cells with a PCI in the second set of PCIs, as described in connection with the example in FIG. 4. For example, monitoring component 606 can monitor for cells with a PCI in the second set of PCIs. In some instances, the monitoring can comprise at least one of an autonomous search function or a search based on a configuration received in an SI or radio resource control message, as described in connection with the example in FIG. 4. The UE can also prioritize cells with PCIs in the first set for at least one of a SI reading, a master information block reading, a system information block reading, a cell measurement, or a cell search, as described in connection with the example in FIG. 4.

In some aspects, the SI can further indicate a second set of PCIs, where the second set of PCIs can include PCIs that are used by the first set of cells, as described in connection with the example in FIG. 4. In some aspects, the first set or the second set can be associated with a set of frequencies, as described in connection with the example in FIG. 4. Also, the monitoring at 504 and 506 can comprise monitoring for a set of frequencies, as described in connection with the example in FIG. 4.

Moreover, the UE can prioritize cells with PCIs in the second set for at least one of a SI reading, a MIB reading, a SIB reading, a cell measurement, or a cell search, as described in connection with the example in FIG. 4. The second set can also be indicated by an information element comprising at least one of a smallest PCI in the second set or a largest PCI in the second set, as described in connection with the example in FIG. 4. Additionally, the first set can be indicated by an information element comprising at least one of a smallest PCI in the first set and a largest PCI in the first set, as described in connection with the example in FIG. 4.

In some aspects, the second set of cells can include one of closed access group (CAG) cells, close subscriber group (CSG) cells, or standalone non-public network (SNPN) cells, as described in connection with the example in FIG. 4. Also, the first set of cells can include one of non-CAG cells, non-CSG cells, or public land mobile network (PLMN) cells, as described in connection with the example in FIG. 4. The cell broadcasting the SI can be a cell belonging to the first set of cells, a cell belonging to the second set of cells, or a PLMN cell, as described in connection with the example in FIG. 4. Additionally, the UE can be one of a UE capable of accessing the first set of cells, a UE with a subscription allowing access to the first set of cells, a UE capable of accessing SNPNs, or a UE capable of accessing CSGs, as described in connection with the example in FIG. 4.

Figure 6:
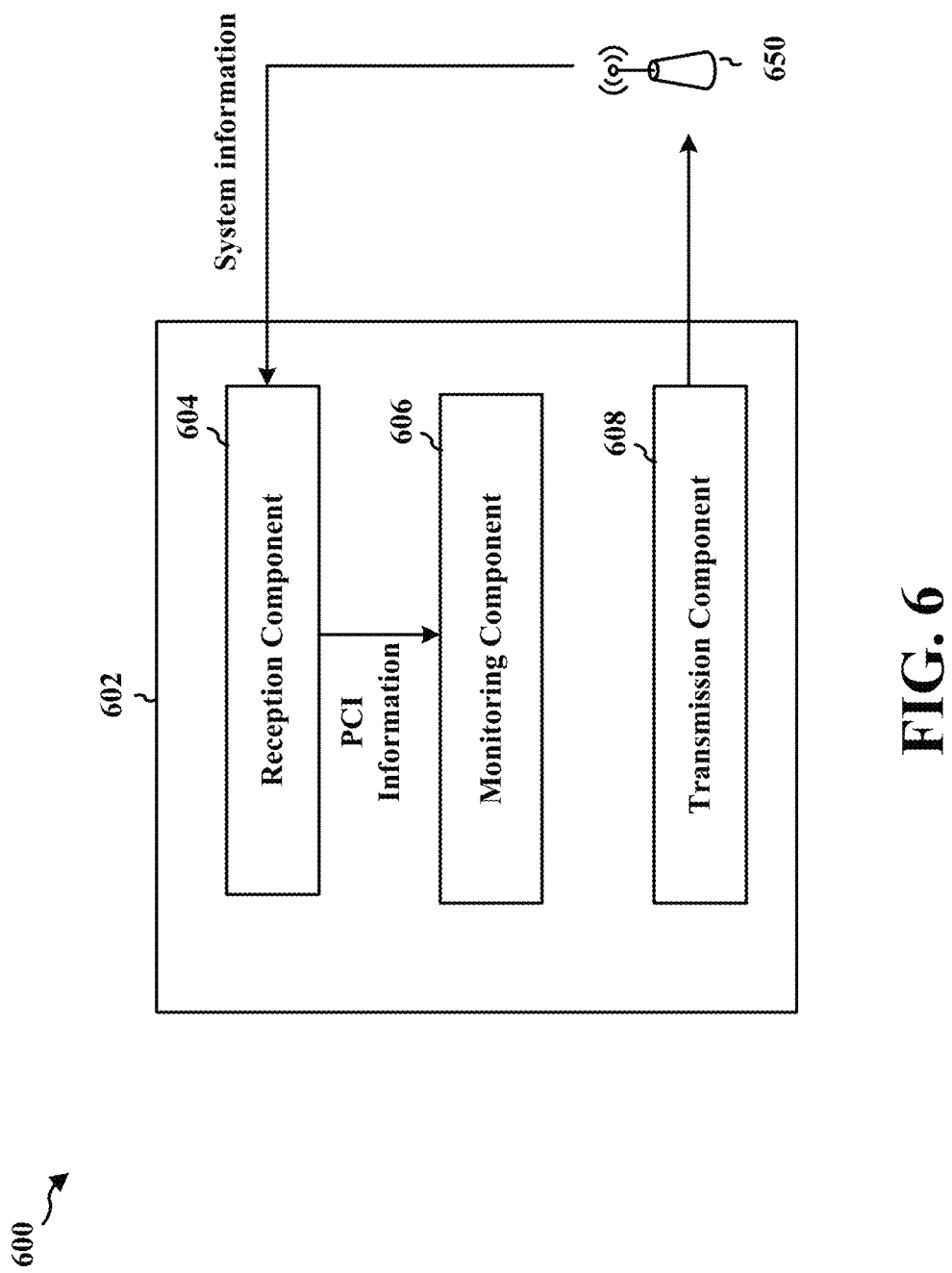
FIG. 6 is a conceptual data flow diagram illustrating the data flow between different means/components in an example apparatus in accordance with some aspects of the present disclosure.

FIG. 6 is a conceptual data flow diagram 600 illustrating the data flow between different means/components in an example apparatus 602. The apparatus 602 may be a UE or a component of a UE. The apparatus 602 includes a reception component 604 that is configured to receive SI broadcast from a cell, where the SI can indicate a first set of PCIs, e.g., as described in connection with block 502 of FIG. 5. The reception component 604 may be configured to receive signals and/or other information from other devices including, e.g., cell 650. The signals/information received by the reception component 604 may be provided to one or more components of the apparatus 602 for further processing and use in performing various operations in accordance with the methods discussed supra including the process of flowchart 500. Thus, via the reception component 604, the apparatus 602 and/or one or more components therein receive signals and/or other information (e.g., such as data for the apparatus 602 and/or other control signaling) from the cell 650 as discussed supra and also discussed more specifically infra. The apparatus 602 includes a monitoring component 606 that is configured to monitor for cells with a PCI in the first set of PCIs, e.g., as described in connection with block 504 of FIG. 5. Monitoring component 606 can also be configured to monitor for cells with a PCI in the second set of PCIs, e.g., as described in connection with block 506 of FIG. 5.

The apparatus 602 also includes a transmission component 608 that is configured to transmit wireless communication, e.g., with cell 650. The transmission component 608 may be configured to transmit various messages to one or more external devices, e.g., including the cell 650, in accordance with the methods disclosed herein. The messages/signals to be transmitted may be generated by one or more other components as discussed above, or the messages/signals to be transmitted may be generated by the transmission component 608 under the direction/control of the one or more other components discussed supra. Thus, in various configurations, via the transmission component 608, the apparatus 602 and/or one or more components therein transmit signals and/or other information (e.g., such as data, control messages and/or other signals) to external devices such as the cell 650.

The apparatus may include additional components that perform each of the blocks of the algorithm in the aforementioned flowcharts of FIGS. 4 and 5. As such, each block in the aforementioned flowcharts of FIGS. 4 and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
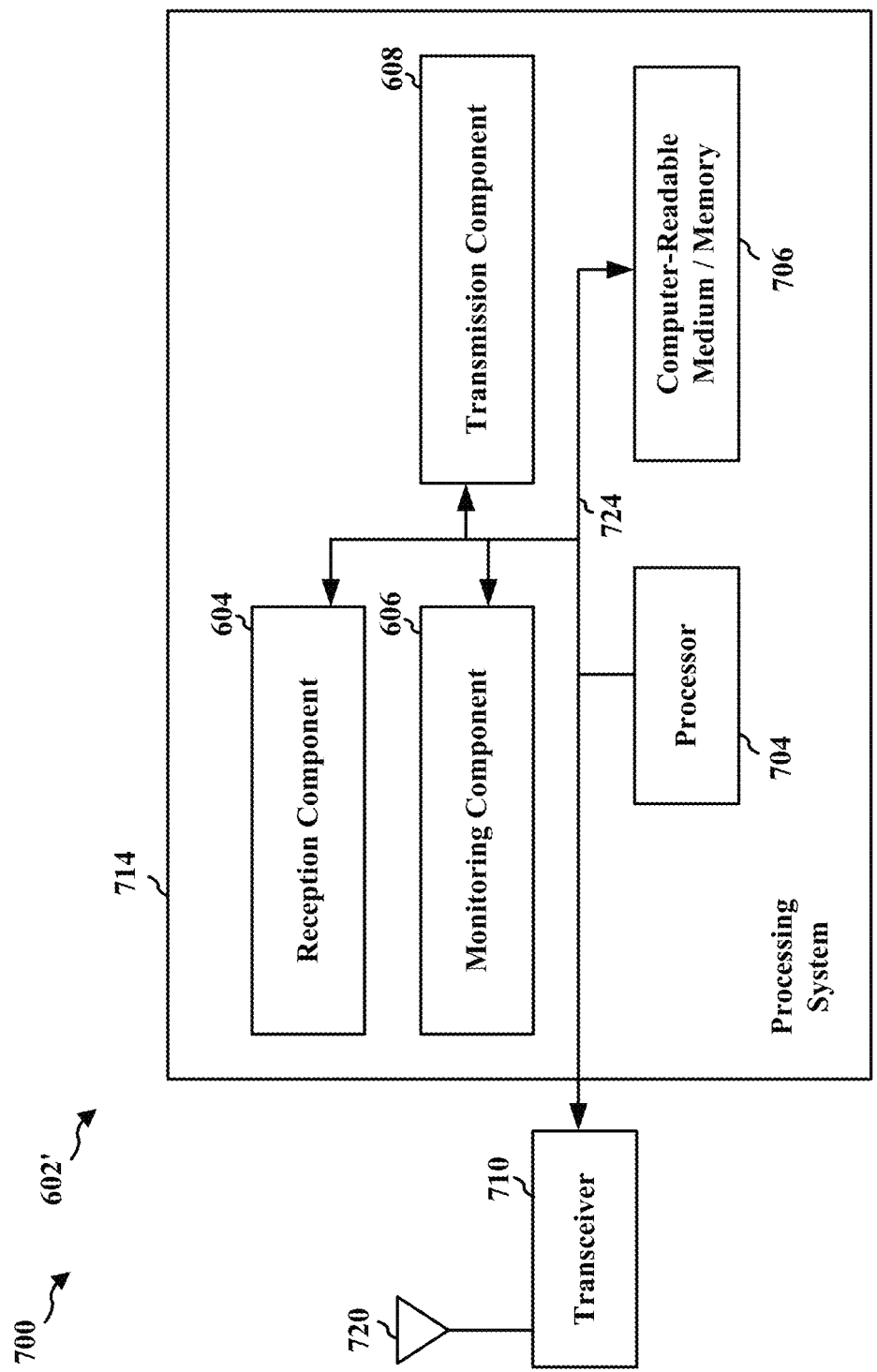
FIG. 7 is a diagram illustrating an example of a hardware implementation for an apparatus employing a processing system in accordance with some aspects of the present disclosure.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 608, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication can include means for receiving SI broadcast from a cell. The apparatus can also include means for monitoring for cells with a PCI in a first set of PCIs. The apparatus can also include means for monitoring for cells with a PCI in a second set of PCIs. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
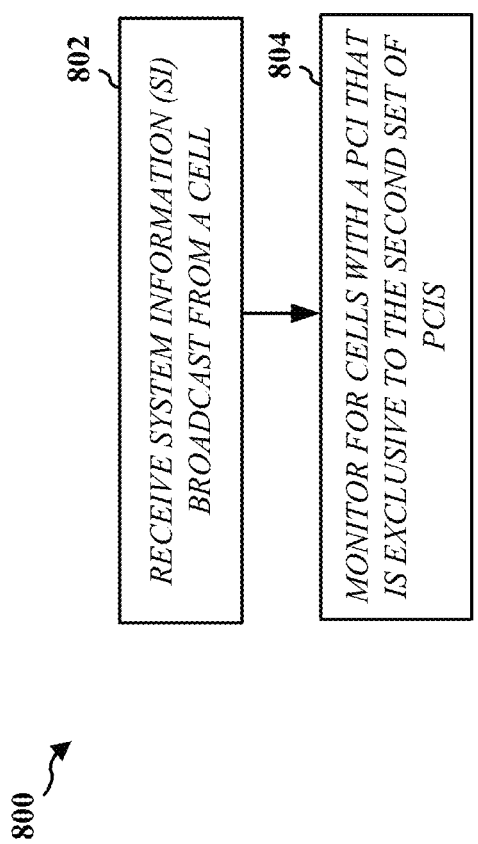
FIG. 8 is a flowchart of a method of wireless communication in accordance with some aspects of the present disclosure.

FIG. 8 is a flowchart 800 of a method of wireless communication. The method may be performed by a UE or a component of a UE (e.g., 104, 350, 404, 406; the apparatus 902/902'; the processing system 1014, which may include the memory 360 and which may be the entire UE or a component of the UE, such as the TX processor 368, the RX processor 356, and/or the controller/processor 359) communicating with a cell or base station (e.g., base station 180, cells 402, 408, apparatus 1202). Optional aspects are illustrated with a dashed line. The methods described herein can provide a number of benefits, such as improving communication signaling, resource utilization, and/or power savings.

At 802, the UE can receive SI broadcast from a cell, where the SI can indicate a first set of PCIs and a second set of PCIs, as described in connection with the example in FIG. 4. For example, reception component 904 can receive SI broadcast from a cell, where the SI can indicate a first set of PCIs and a second set of PCIs. In some aspects, the first set of PCIs can include at least PCIs that are used by either a first set of cells or a second set of cells, the second set of PCIs including PCIs that are exclusively used by the second set of cells, as described in connection with the example in FIG. 4.

At 804, the UE can monitor for cells with a PCI that is exclusive to the second set of PCIs, as described in connection with the example in FIG. 4. For example, monitoring component 906 can monitor for cells with a PCI that is exclusive to the second set of PCIs. In some aspects, at least one of the first set or the second set can be associated with a set of frequencies, as described in connection with the example in FIG. 4. Also, the monitoring can comprise monitoring for the set of frequencies, as described in connection with the example in FIG. 4. Further, the monitoring can comprise at least one of an autonomous search function or a search based on a configuration received in an SI or radio resource control (RRC) message, as described in connection with the example in FIG. 4.

In some aspects, the second set of cells can include one of closed access group (CAG) cells, close subscriber group (CSG) cells, or standalone non-public network (SNPN) cells, as described in connection with the example in FIG. 4. Also, the second set of cells can include one of non-CAG cells, non-CSG cells, or public land mobile network (PLMN) cells, as described in connection with the example in FIG. 4. The first set of PCIs can further include PCIs that are used by the first set of cells, as described in connection with the example in FIG. 4.

In some instances, the cell broadcasting the SI can be a cell belonging to the first set of cells, a cell belonging to the second set of cells, or a PLMN cell, as described in connection with the example in FIG. 4. Also, the UE can be one of a UE not capable of accessing the second set of cells, a UE whose subscription does not allow access to the second set of cells, a UE not operating in SNPN access mode, a UE not capable of accessing CSGs, or a UE whose subscription does not allow accessing CSGs, as described in connection with the example in FIG. 4. The first set can be indicated by an information element having at least one of a smallest PCI in the first set or a largest PCI in the first set, as described in connection with the example in FIG. 4. Further, the second set can be indicated by an information element comprising at least one of a smallest PCI in the second set or a largest PCI in the second set, as described in connection with the example in FIG. 4.

Figure 9:
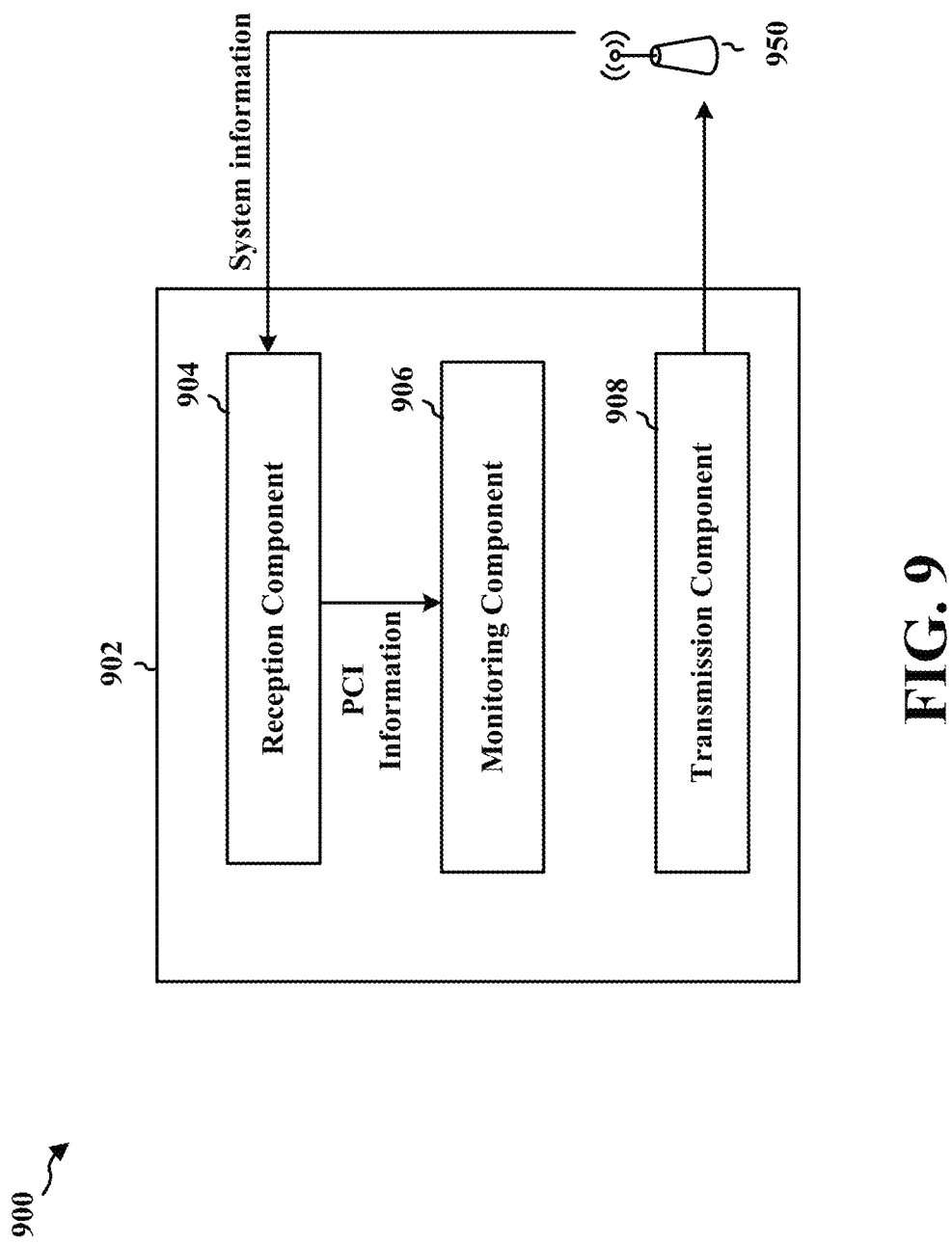
FIG. 9 is a conceptual data flow diagram illustrating the data flow between different means/components in an example apparatus in accordance with some aspects of the present disclosure.

FIG. 9 is a conceptual data flow diagram 900 illustrating the data flow between different means/components in an example apparatus 902. The apparatus may be a UE or a component of a UE. The apparatus includes a reception component 904 that is configured to receive SI broadcast from a cell, where the SI can indicate a first set of PCIs and a second set of PCIs, e.g., as described in connection with block 802 of FIG. 8. The reception component 904 may be configured to receive signals and/or other information from other devices including, e.g., cell 950. The signals/information received by the reception component 904 may be provided to one or more components of the apparatus 902 for further processing and use in performing various operations in accordance with the methods discussed supra including the process of flowchart 500. Thus, via the reception component 904, the apparatus 902 and/or one or more components therein receive signals and/or other information (e.g., such as data for the apparatus 902 and/or other control signaling) from the cell 950 as discussed supra and also discussed more specifically infra.

The apparatus includes a monitoring component 906 that is configured to monitor for cells with a PCI that is exclusive to the second set of PCIs, e.g., as described in connection with block 804 of FIG. 8.

The apparatus 902 also includes a transmission component 908 that is configured to transmit wireless communication, e.g., with cell 950. The transmission component 908 may be configured to transmit various messages to one or more external devices, e.g., including the cell 950, in accordance with the methods disclosed herein. The messages/signals to be transmitted may be generated by one or more other components as discussed above, or the messages/signals to be transmitted may be generated by the transmission component 908 under the direction/control of the one or more other components discussed supra. Thus, in various configurations, via the transmission component 908, the apparatus 902 and/or one or more components therein transmit signals and/or other information (e.g., such as data, control messages and/or other signals) to external devices such as the cell 950.

The apparatus may include additional components that perform each of the blocks of the algorithm in the aforementioned flowcharts of FIGS. 4 and 8. As such, each block in the aforementioned flowcharts of FIGS. 4 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
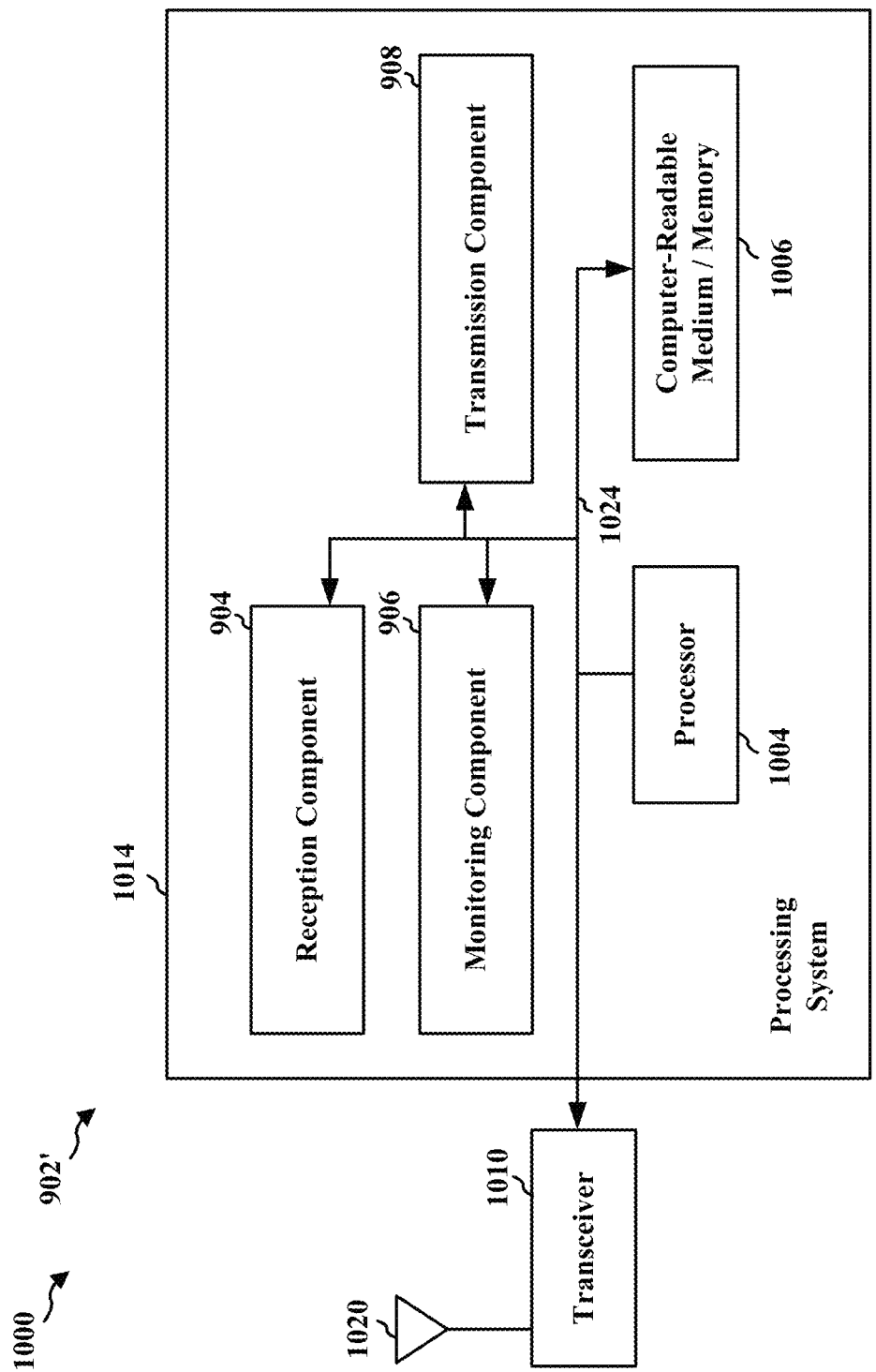
FIG. 10 is a diagram illustrating an example of a hardware implementation for an apparatus employing a processing system in accordance with some aspects of the present disclosure.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 908, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication can include means for receiving SI broadcast from a cell, where the SI can indicate a first set of PCIs and a second set of PCIs. The apparatus can also include means for monitoring for cells with a PCI that is exclusive to the second set of PCIs. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
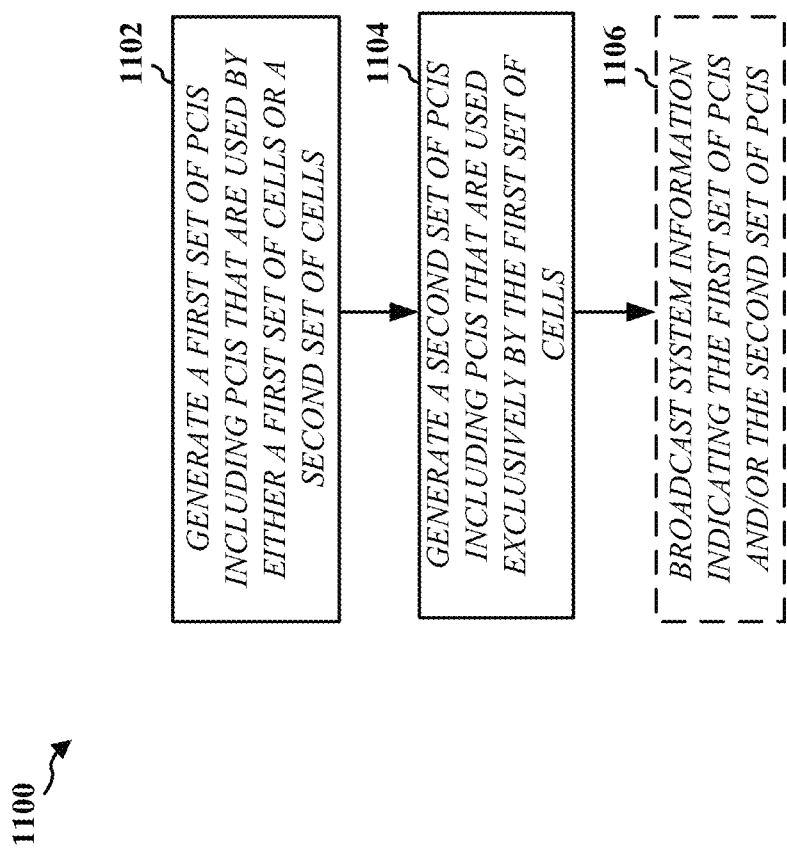
FIG. 11 is a flowchart of a method of wireless communication in accordance with some aspects of the present disclosure.

FIG. 11 is a flowchart 1100 of a method of wireless communication. The method may be performed by a cell or base station or a component of a cell or base station (e.g., base station 180, cells 402, 408; apparatus 1202/1202'; the processing system 1314, which may include the memory 376 and which may be the entire cell or base station or a component of the cell or base station, such as the TX processor 316, the RX processor 370, and/or the controller/processor 375) communicating with a UE (e.g., UE 104, 350, 404, 406; apparatus 602/602' and 902/902'). Optional aspects are illustrated with a dashed line. The methods described herein can provide a number of benefits, such as improving communication signaling, resource utilization, and/or power savings.

At 1102, the cell can generate a first set of PCIs including at least PCIs that are used by either a first set of cells or a second set of cells, as described in connection with the example in FIG. 4. For example, generation component 1206 can generate a first set of PCIs including at least PCIs that are used by either a first set of cells or a second set of cells.

At 1104, the cell can generate a second set of PCIs including PCIs that are used by the first set of cells, as described in connection with the example in FIG. 4. For example, generation component 1206 can generate a second set of PCIs including PCIs that are exclusively used by the second set of cells.

At 1106, the cell can broadcast SI indicating the first set of PCIs, as described in connection with the example in FIG. 4. For example, broadcast component 1208 via the transmission component 1210 can broadcast SI indicating the first set of PCIs. In some aspects, the broadcast SI can further indicate the second set of PCIs, as described in connection with the example in FIG. 4.

In some aspects, the first set of PCIs can be generated to further include PCIs that are used by the first set of cells, as described in connection with the example in FIG. 4. Also, the first set of PCIs includes PCIs on a first set of frequencies, as described in connection with the example in FIG. 4. Further, the first set of frequencies associated with the first set of PCIs can be indicated in the SI, as described in connection with the example in FIG. 4. The second set can also include PCIs on a second set of frequencies, as described in connection with the example in FIG. 4. Also, the second set of frequencies associated with the second set can be indicated in the SI, as described in connection with the example in FIG. 4.

In some aspects, the second set of cells can include one of closed access group (CAG) cells, close subscriber group (CSG) cells, or standalone non-public network (SNPN) cells, as described in connection with the example in FIG. 4. Also, the second set of cells can include one of non-CAG cells, non-CSG cells, or public land mobile network (PLMN) cells, as described in connection with the example in FIG. 4. Further, the cell can be a CAG cell, a CSG cell, or a SNPN cell, as described in connection with the example in FIG. 4. The cell can also be a non-CAG cell, a non-CSG cell, or a PLMN cell, as described in connection with the example in FIG. 4. Additionally, the cell can be a base station or a component of the base station, as described in connection with the example in FIG. 4.

Figure 12:
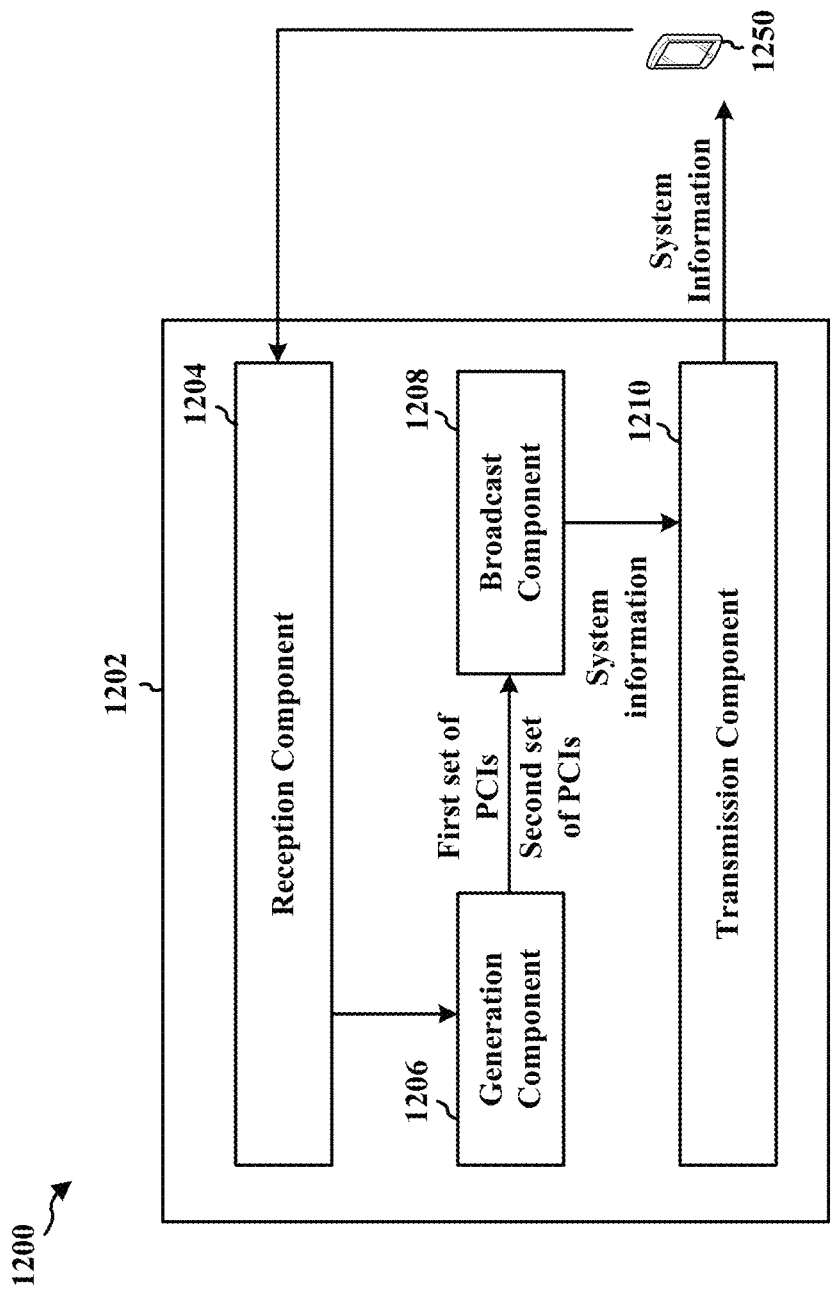
FIG. 12 is a conceptual data flow diagram illustrating the data flow between different means/components in an example apparatus in accordance with some aspects of the present disclosure.

FIG. 12 is a conceptual data flow diagram 1200 illustrating the data flow between different means/components in an example apparatus 1202. The apparatus may be a cell or base station. The apparatus can includes a reception component 1204 that is configured to receive communication, e.g., from UE 1250. The reception component 1204 may be configured to receive signals and/or other information from other devices including, e.g., UE 1250. The signals/information received by the reception component 1204 may be provided to one or more components of the apparatus 1202 for further processing and use in performing various operations in accordance with the methods discussed supra including the process of flowchart 800. Thus, via the reception component 1204, the apparatus 1202 and/or one or more components therein receive signals and/or other information (e.g., such as data for the apparatus 1202 and/or other control signaling) from the UE 1250 as discussed supra and also discussed more specifically infra.

The apparatus 1202 can also include a generation component 1206 that is configured to generate a first set of PCIs including at least PCIs that are used by either a first set of cells or a second set of cells, e.g., as described in connection with block 1102 of FIG. 11. Generation component 1206 can also be configured to generate a second set of PCIs including PCIs that are used by the second set of cells, e.g., as described in connection with block 1104 of FIG. 11. The apparatus 1202 can also include a broadcast component 1208 that is configured to broadcast, e.g., via transmission component 1210, SI indicating the first set of PCIs and/or the second set of PCIs, as described in connection with block 1106 above.

The apparatus 1202 also includes a transmission component 1210 that is configured to transmit wireless communication, e.g., with UE 1250. The transmission component 1210 may be configured to transmit various messages to one or more external devices, e.g., including the UE 1250, in accordance with the methods disclosed herein. The messages/signals to be transmitted may be generated by one or more other components as discussed above, or the messages/signals to be transmitted may be generated by the transmission component 1208 under the direction/control of the one or more other components discussed supra. Thus, in various configurations, via the transmission component 1208, the apparatus 1202 and/or one or more components therein transmit signals and/or other information (e.g., such as data, system information (e.g., MIB, PSS/SSS, control messages and/or other signals) to external devices such as the UE 1250.

The apparatus may include additional components that perform each of the blocks of the algorithm in the aforementioned flowcharts of FIGS. 4 and 11. As such, each block in the aforementioned flowcharts of FIGS. 4 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
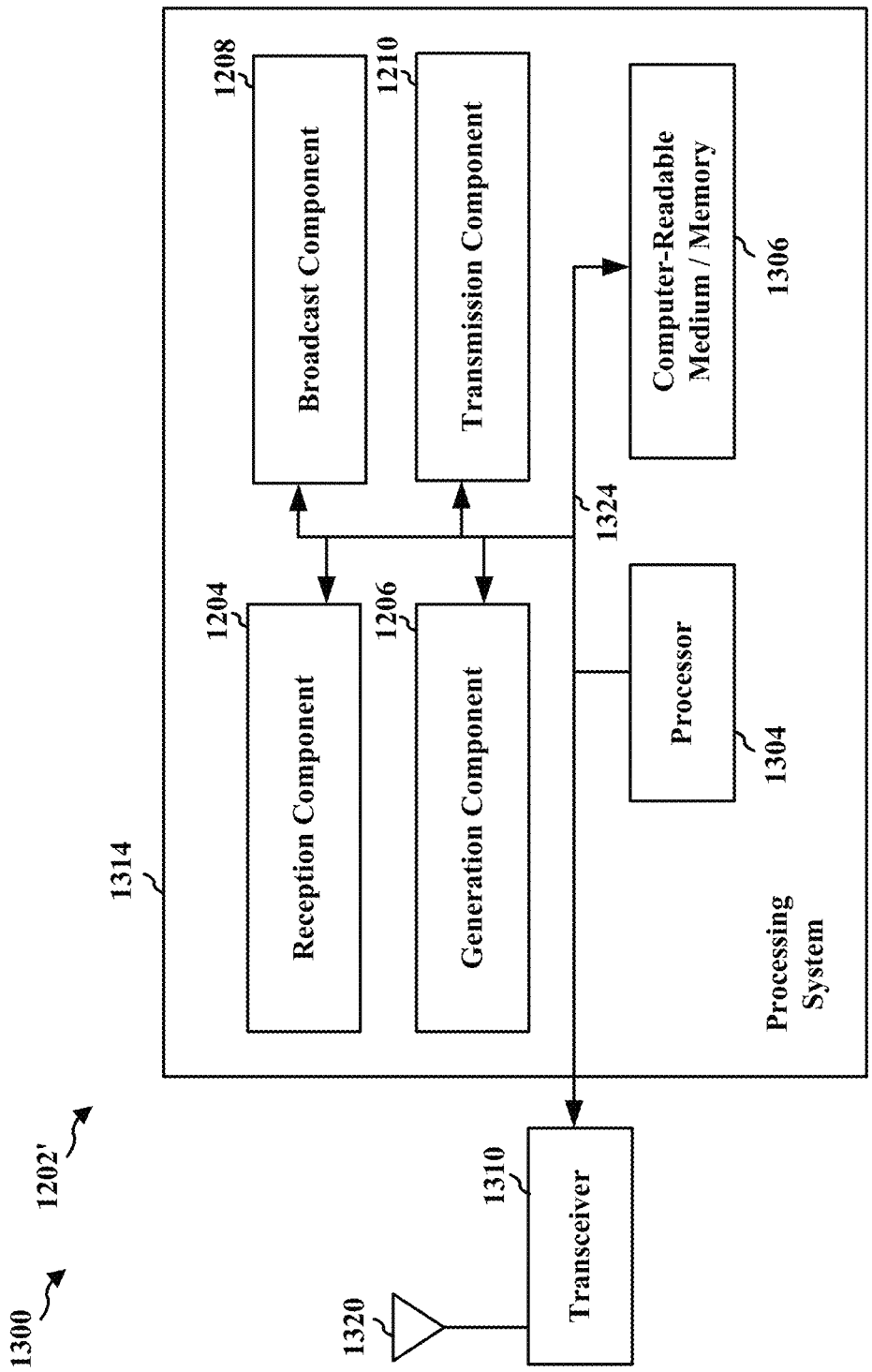
FIG. 13 is a diagram illustrating an example of a hardware implementation for an apparatus employing a processing system in accordance with some aspects of the present disclosure.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication can include means for means for generating SI indicating a first set of PCIs for a first set of cells or a second set of cells and a second set of PCIs exclusively for the second set of cells. The apparatus can also include means for means for communicating, in a subband of a plurality of subbands to one or more UEs, the SI. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with aspects of other embodiments or teachings described herein, without limitation.

Example 1 is a method of wireless communication at a UE, comprising: receiving, in a subband of a plurality of subbands from a cell, system information (SI) indicating a first set of physical cell identities (PCIs) containing PCIs associated with a first cell type or a second cell type, the first cell type being accessible to a first set of UEs and the second cell type being accessible to a second set of UEs and a second set of PCIs containing PCIs corresponding to a set of cells of the second cell type; and monitoring for one or more cells with a PCI in one or more of the first set of PCIs or the second set of PCIs.

In Example 2, the method of Example 1 further includes that the subband comprises a set of frequencies, the receiving the SI comprises receiving, in the set of frequencies from the cell, a system information block indicating the one or more of the first set of PCIs or the second set of PCIs, and the monitoring for the one or more cells comprises monitoring, in the set of frequencies, for the one or more cells with the PCI in the one or more of the first set of PCIs or the second set of PCIs.

In Example 3, the method of any of Example 1 or Example 2 further includes that the subband comprises a first set of frequencies, the receiving the SI comprises receiving, in the first set of frequencies from the cell, a first system information block (SIB) indicating the first set of PCIs, and the monitoring for the one or more cells comprises monitoring, in the first set of frequencies, for the one or more cells with the PCI in the first set of PCIs.

In Example 4, the method of any of Examples 1 to 3 further includes that the subband comprises a second set of frequencies different from the first set of frequencies, the receiving the SI comprises receiving, in the second set of frequencies from the cell, a second SIB indicating the second set of PCIs, and the monitoring for the one or more cells comprises monitoring, in the second set of frequencies, for the one or more cells with the PCI in the second set of PCIs.

In Example 5, the method of any of Examples 1 to 4 further includes that the UE has access to the set of cells of the second cell type that is exclusively accessible to the second set of UEs that includes the UE.

In Example 6, the method of any of Examples 1 to 4 further includes that the UE has access to a set of cells of the first cell type and restricted access to the set of cells of the second cell type.

In Example 7, the method of any of Examples 1 to 6 further includes that the receiving the SI comprises receiving, in the set of frequencies from the cell, a system information block (SIB) indicating the one or more of the first set of PCIs or the second set of PCIs.

In Example 8, the method of any of Examples 1 to 7 further includes prioritizing cells with PCIs in the first set of PCIs based on a frequency of each cell for one or more of a SI reading, a master information block (MIB) reading, a system information block (SIB) reading, a cell measurement or a cell search for selection of a cell with a PCI in the first set of PCIs.

In Example 9, the method of any of Examples 1 to 8 further includes that the receiving the SI comprises receiving a radio resource control message comprising the SI, and the monitoring for the one or more cells comprises searching, in a set of frequencies, for the one or more cells based on a configuration in the RRC message.

In Example 10, the method of any of Examples 1 to 9 further includes that the monitoring for the one or more cells comprises monitoring a set of frequencies in the subband on which the SI is received using an autonomous search function to independently determine which frequencies of the one or more cells to search.

In Example 11, the method of any of Examples 1 to 10 further includes that the set of cells of the second cell type comprises closed access group (CAG) cells, closed subscriber group (CSG) cells, or standalone non-public network (SNPN) cells, the PCIs associated with the first cell type in the first set of PCIs correspond to a set of cells of the first cell type, and the set of cells of the first cell type comprises non-CAG cells, non-CSG cells, or public land mobile network (PLMN) cells.

In Example 12, the method of any of Examples 1 to 11 further includes that the SI comprises an information element that indicates the first set of PCIs using a smallest PCI in the first set of PCIs or a largest PCI in the first set of PCIs.

In Example 13, the method of any of Examples 1 to 11 further includes that the UE corresponds to one of (1) a closed access group (CAG) UE configured to access CAG cells, (2) a UE configured to access CAG cells with a subscription allowing access to CAG cells, (3) a UE configured to access a standalone non-public network (SNPN), or (4) a UE configured to access closed subscriber group (CSG) cells.

Example 14 is a device including one or more processors and one or more memories in electronic communication with the one or more processors storing instructions executable by the one or more processors to cause a system or an apparatus to implement a method as in any of Examples 1 to 13.

Example 15 is a system or apparatus including means for implementing a method or realizing an apparatus as in any of Examples 1 to 13.

Example 16 is a non-transitory computer-readable medium storing instructions executable by one or more processors to cause the one or more processors to implement a method as in any of Examples 1 to 13.

Example 17 is a method of wireless communication at a base station, comprising: generating system information (SI) indicating a first set of physical cell identities (PCIs) containing PCIs associated with a first cell type or a second cell type, the first cell type being accessible to a first set of user equipments (UEs) and the second cell type being accessible to a second set of UEs and a second set of PCIs containing PCIs corresponding to a set of cells of the second cell type; and communicating, in a subband of a plurality of subbands to one or more of the first set of UEs or the second set of UEs, the SI.

In Example 18, the method of Example 17 further includes that the subband comprises a set of frequencies, the communicating the SI comprises transmitting, in the set of frequencies to the one or more of the first set of UEs or the second set of UEs, a system information block indicating the one or more of the first set of PCIs or the second set of PCIs.

In Example 19, the method of any of Example 17 or Example 18 further includes that the subband comprises a first set of frequencies and a second set of frequencies different from the first set of frequencies, the communicating the SI comprises: transmitting, in the first set of frequencies to the first set of UEs and the second set of UEs, a first system information block (SIB) indicating the first set of PCIs, and transmitting, in the second set of frequencies to the second set of UEs, a second SIB indicating the second set of PCIs.

In Example 20, the method of any of Examples 17 to 19 further includes that the communicating the SI comprises transmitting, in the set of frequencies to the one or more UEs, a system information block (SIB) indicating the one or more of the first set of PCIs or the second set of PCIs.

In Example 21, the method of any of Examples 17 to 20 further includes that the communicating the SI comprises transmitting a radio resource control (RRC) message comprising the SI.

Example 22 is a device including one or more processors and one or more memories in electronic communication with the one or more processors storing instructions executable by the one or more processors to cause a system or an apparatus to implement a method as in any of Examples 1 to 21.

Example 23 is a system or apparatus including means for implementing a method or realizing an apparatus as in any of Examples 1 to 21.

Example 24 is a non-transitory computer-readable medium storing instructions executable by one or more processors to cause the one or more processors to implement a method as in any of Examples 1 to 21.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
   receiving, from a cell, in a subband of a plurality of subbands system information (SI) indicating a first set of physical cell identities (PCIs) and a second set of PCIs, the first set of PCIs containing PCIs associated with a first cell type and a second cell type, the first cell type being accessible to a first set of UEs and the second cell type being accessible to a second set of UEs, the second set of PCIs containing PCIs corresponding to a set of cells of the second cell type that are different from PCIs of the second cell type in the first set of PCIs; and
   monitoring for one or more cells with a PCI in one or more of the first set of PCIs or the second set of PCIs.

2. The method of claim 1, wherein:
   the subband comprises a set of frequencies,
   the receiving the SI comprises receiving, in the set of frequencies from the cell, a system information block indicating the one or more of the first set of PCIs or the second set of PCIs, and
   the monitoring for the one or more cells comprises monitoring, in the set of frequencies, for the one or more cells with the PCI in the one or more of the first set of PCIs or the second set of PCIs.

3. The method of claim 2, wherein the receiving the SI comprises receiving, in a set of frequencies from the cell, a system information block (SIB) indicating the one or more of the first set of PCIs or the second set of PCIs.

4. The method of claim 1, wherein:
   the subband comprises a first set of frequencies,
   the receiving the SI comprises receiving, in the first set of frequencies, from the cell, a first system information block (SIB) indicating the first set of PCIs, and
   the monitoring for the one or more cells comprises monitoring, in the first set of frequencies, for the one or more cells with the PCI in the first set of PCIs.

5. The method of claim 4, wherein:
   the subband comprises a second set of frequencies different from the first set of frequencies,
   the receiving the SI comprises receiving, in the second set of frequencies from the cell, a second SIB indicating the second set of PCIs, and
   the monitoring for the one or more cells comprises monitoring, in the second set of frequencies, for the one or more cells with the PCI in the second set of PCIs.

6. The method of claim 5, wherein the UE has access to the set of cells of the second cell type that is exclusively accessible to the second set of UEs that includes the UE.

7. The method of claim 5, wherein the UE has access to a set of cells of the first cell type and restricted access to the set of cells of the second cell type.

8. The method of claim 1, further comprising:
   prioritizing cells with PCIs in the first set of PCIs based on a frequency of each cell for one or more of a SI reading, a master information block (MIB) reading, a system information block (SIB) reading, a cell measurement or a cell search for selection of a cell with a PCI in the first set of PCIs.

9. The method of claim 1, wherein:
   the receiving the SI comprises receiving a radio resource control (RRC) message comprising the SI, and
   the monitoring for the one or more cells comprises searching, in a set of frequencies, for the one or more cells based on a configuration in the RRC message.

10. The method of claim 1, wherein the monitoring for the one or more cells comprises monitoring a set of frequencies in the subband on which the SI is received using an autonomous search function to independently determine which frequencies of the one or more cells to search.

11. The method of claim 1, wherein:
   the set of cells of the second cell type comprises closed access group (CAG) cells, closed subscriber group (CSG) cells, or standalone non-public network (SNPN) cells,
   the PCIs associated with the first cell type in the first set of PCIs correspond to a set of cells of the first cell type, and
   the set of cells of the first cell type comprises non-CAG cells, non-CSG cells, or public land mobile network (PLMN) cells.

12. The method of claim 1, wherein the SI comprises an information element that indicates the first set of PCIs using a smallest PCI in the first set of PCIs or a largest PCI in the first set of PCIs.

13. The method of claim 1, wherein the UE corresponds to one of (1) a closed access group (CAG) UE configured to access CAG cells, (2) a UE configured to access CAG cells with a subscription allowing access to CAG cells, (3) a UE configured to access a standalone non-public network (SNPN), or (4) a UE configured to access closed subscriber group (CSG) cells.

14. An apparatus for wireless communication at a user equipment (UE), comprising:
a memory; and
at least one processor coupled to the memory and configured to:
receive, from a cell, in a subband of a plurality of subbands, system information (SI) indicating a first set of physical cell identities (PCIs) and a second set of PCIs, the first set of PCIs containing PCIs associated with a first cell type and a second cell type, the first cell type being accessible to a first set of UEs and the second cell type being accessible to a second set of UEs, the second set of PCIs containing PCIs corresponding to a set of cells of the second cell type that are different from PCIs of the second cell type in the first set of PCIs; and
monitor for one or more cells with a PCI in one or more of the first set of PCIs or the second set of PCIs.

15. The apparatus of claim 14, wherein:
the subband comprises a set of frequencies,
the reception of the SI comprises to receive, in the set of frequencies from the cell, a system information block indicating the one or more of the first set of PCIs or the second set of PCIs, and
the monitoring for the one or more cells comprises to monitor, in the set of frequencies, for the one or more cells with the PCI in the one or more of the first set of PCIs or the second set of PCIs.

16. The apparatus of claim 15, wherein the receiving the SI comprises receiving, in a set of frequencies from the cell, a system information block (SIB) indicating the one or more of the first set of PCIs or the second set of PCIs.

17. The apparatus of claim 14, wherein:
the subband comprises a first set of frequencies,
the reception of the SI comprises to receive, in the first set of frequencies from the cell, a first system information block (SIB) indicating the first set of PCIs, and
the monitoring for the one or more cells comprises to monitor, in the first set of frequencies, for the one or more cells with the PCI in the first set of PCIs.

18. The apparatus of claim 17, wherein:
the subband comprises a second set of frequencies different from the first set of frequencies,
the reception of the SI comprises to receive, in the second set of frequencies from the cell, a second SIB indicating the second set of PCIs, and
the monitoring for the one or more cells comprises to monitor, in the second set of frequencies, for the one or more cells with the PCI in the second set of PCIs.

19. The apparatus of claim 18, wherein the UE has access to the set of cells of the second cell type that is exclusively accessible to the second set of UEs that includes the UE.

20. The apparatus of claim 18, wherein the UE has access to a set of cells of the first cell type and restricted access to the set of cells of the second cell type.

21. A method of wireless communication performed by a base station, the method comprising:
generating system information (SI) indicating a first set of physical cell identities (PCIs) and a second set of PCIs, the first set of PCIs containing PCIs associated with a first cell type and a second cell type, the first cell type being accessible to a first set of user equipments (UEs) and the second cell type being accessible to a second set of UEs, the second set of PCIs containing PCIs corresponding to a set of cells of the second cell type that are different from PCIs of the second cell type in the first set of PCIs; and
communicating, in a subband of a plurality of subbands, to one or more of the first set of UEs or the second set of UEs, the SI.

22. The method of claim 21, wherein:
the subband comprises a set of frequencies, and
the communicating the SI comprises transmitting, in the set of frequencies to the one or more of the first set of UEs or the second set of UEs, a system information block indicating the one or more of the first set of PCIs or the second set of PCIs.

23. The method of claim 22, wherein the communicating the SI comprises transmitting, in the set of frequencies to the one or more UEs, a system information block (SIB) indicating the one or more of the first set of PCIs or the second set of PCIs.

24. The method of claim 21, wherein:
the subband comprises a first set of frequencies and a second set of frequencies different from the first set of frequencies, and
the communicating the SI comprises:
transmitting, in the first set of frequencies to the first set of UEs and the second set of UEs, a first system information block (SIB) indicating the first set of PCIs, and
transmitting, in the second set of frequencies to the second set of UEs, a second SIB indicating the second set of PCIs.

25. The method of claim 21, wherein:
the communicating the SI comprises transmitting a radio resource control (RRC) message comprising the SI.

26. An apparatus for wireless communication at a base station, comprising:
a memory; and
at least one processor coupled to the memory and configured to:
generate system information (SI) indicating a first set of physical cell identities (PCIs) and a second set of PCIs, the first set of PCIs containing PCIs associated with a first cell type and a second cell type, the first cell type being accessible to a first set of user equipments (UEs) and the second cell type being accessible to a second set of UEs, the second set of PCIs containing PCIs corresponding to a set of cells of the second cell type that are different from PCIs of the second cell type in the first set of PCIs; and
communicate, in a subband of a plurality of subbands to one or more of the first set of UEs or the second set of UEs, the SI.

27. The apparatus of claim 26, wherein:
the subband comprises a set of frequencies, and
the communication of the SI comprises to transmit, in the set of frequencies to the one or more of the first set of UEs or the second set of UEs, a system information block indicating the one or more of the first set of PCIs or the second set of PCIs.

28. The apparatus of claim 27, wherein the communication of the SI comprises to transmit, in the set of frequencies to the one or more of the first set of UEs or the second set of UEs, a system information block (SIB) indicating the one or more of the first set of PCIs or the second set of PCIs.

29. The apparatus of claim 26, wherein:
the subband comprises a first set of frequencies and a second set of frequencies different from the first set of frequencies, and
the communication of the SI comprises to:
transmit, in the first set of frequencies to the first set of UEs and the second set of UEs, a first system information block (SIB) indicating the first set of PCIs, and transmit, in the second set of frequencies to the second set of UEs, a second SIB indicating the second set of PCIs.

30. The apparatus of claim 26, wherein:
the communication of the SI comprises to transmit a radio resource control (RRC) message comprising the SI.

\* \* \* \* \*